May 24, 1932.  T. L. FAWICK  1,860,142
TRANSMISSION
Original Filed Nov. 6, 1928   2 Sheets-Sheet 1

Inventor
Thomas L. Fawick
By Brown, Jackson, Boettcher & Dienner
Atty's.

May 24, 1932. T. L. FAWICK 1,860,142
TRANSMISSION
Original Filed Nov. 6, 1928  2 Sheets-Sheet 2
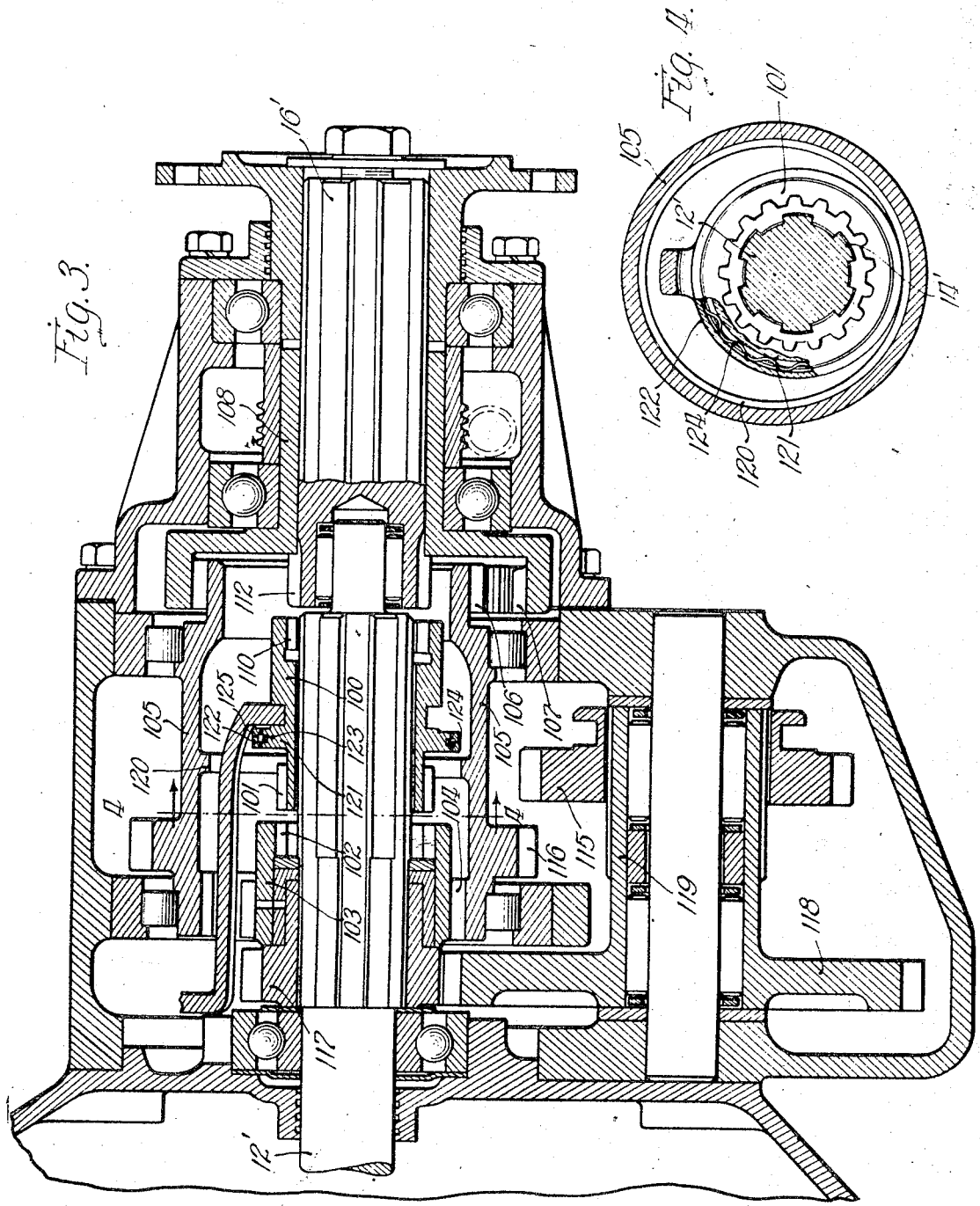
Inventor
Thomas L. Fawick
By Brown, Jackson, Boettcher & Dienner
Attys.

Patented May 24, 1932

1,860,142

UNITED STATES PATENT OFFICE

THOMAS L. FAWICK, OF AKRON, OHIO, ASSIGNOR TO BROWN-LIPE GEAR COMPANY, OF SYRACUSE, NEW YORK, A CORPORATION OF NEW YORK

TRANSMISSION

Application filed November 6, 1928, Serial No. 317,505. Renewed March 28, 1932.

This invention relates to transmissions for automotive purposes and particularly to transmissions for automobiles and the like.

I shall describe the invention in connection with a transmission which is in the nature of an improvement upon the device disclosed and claimed in my prior application, Serial No. 197,777, filed June 10, 1927, and also in connection with the device disclosed and claimed in my prior application, Serial No. 200,822, filed June 23, 1927, but it is to be understood that the present invention is not to be limited to use with these transmissions of the double internal gear type, but may be used with the conventional or any other type of transmission or wherever found adaptable.

It is well recognized that present day demands make it desirable for the motorist, without expert driving skill, to be able to shift gears quickly and, at the same time, to make the shift without clashing the gears, as well as without stripping the teeth or otherwise damaging the mechanism. It is now generally customary, in shifting from a lower speed to a higher speed, to hesitate momentarily in neutral and then shift or move the lever to the desired position and it has not usually been possible to shift from a higher speed to a lower speed without practically bringing the car to a standstill. Even after hesitating in neutral in shifting up and bringing the car to practically a standstill in shifting down, the shift is commonly with effort and noise.

Transmissions employing synchronizing means for bringing two rotating toothed members to substantially the same speeds of rotation, as they are about to be meshed or drivingly engaged, are known. As heretofore constructed, they have been difficult and expensive to manufacture and have required considerable departure from standard practice in the structure of the transmission mechanism. These synchronizing devices have been in the form of cone clutches, the nature of which has required that they be disengaged by movement in a direction opposite that with which they are engaged. This has required additional rather delicate and intricate means for effecting this disengagement, as the toothed rotating members are meshed.

Additional means, in the form of an intricate cam mechanism, has also been required for actuating the synchronizing means from the control lever and the transmission gears themselves are permanently meshed at all points of synchronization, which necessitates freeing gears which are now commonly normally or permanently splined or otherwise connected to turn the propeller shaft or propeller extension shaft therewith. This necessitates considerable departure from present transmission practice and instead of just the different connecting or ratio gears for each speed or gear ratio, a separate pair of clutch or other interlocking toothed members must be provided for every synchronized speed other than the direct connection. This further increases the number of additional parts required, also the complexity and cost of the transmission and the susceptibility to disorder.

According to my present invention, the synchronizing means is simplified and reduced in cost. The additional actuating means heretofore required therefor is eliminated. The synchronizing means is engaged or rendered operative before the actual engagement of the gears or other members to be connected and the synchronizing means is disengaged by a continued movement in the same direction. This eliminates the intricacies heretofore necessary where it has been necessary to disengage the synchronizing elements by movement in a direction opposite to the direction of movement by which these elements are engaged or rendered operative.

A further feature of the present invention is the provision of certain improvements in the device itself of my prior application, Serial No. 197,777, filed June 10, 1927. These improvements reside in the structure and manner of positioning the pinion which connects the sliding clutch sleeve with the eccentric sleeve and in simplifying and reducing the bulk and inertia of the shiftable gear means on the lay shaft.

In order to acquaint those skilled in the art with the present invention, I shall now describe the invention in connection with the accompanying drawings, in which:

Figure 3 is a view similar to Figure 1, showing the invention in connection with another form of transmission; and Figure 4 is a detail section, taken on the line 4—4 of Figure 3.

Figures 1, 2:
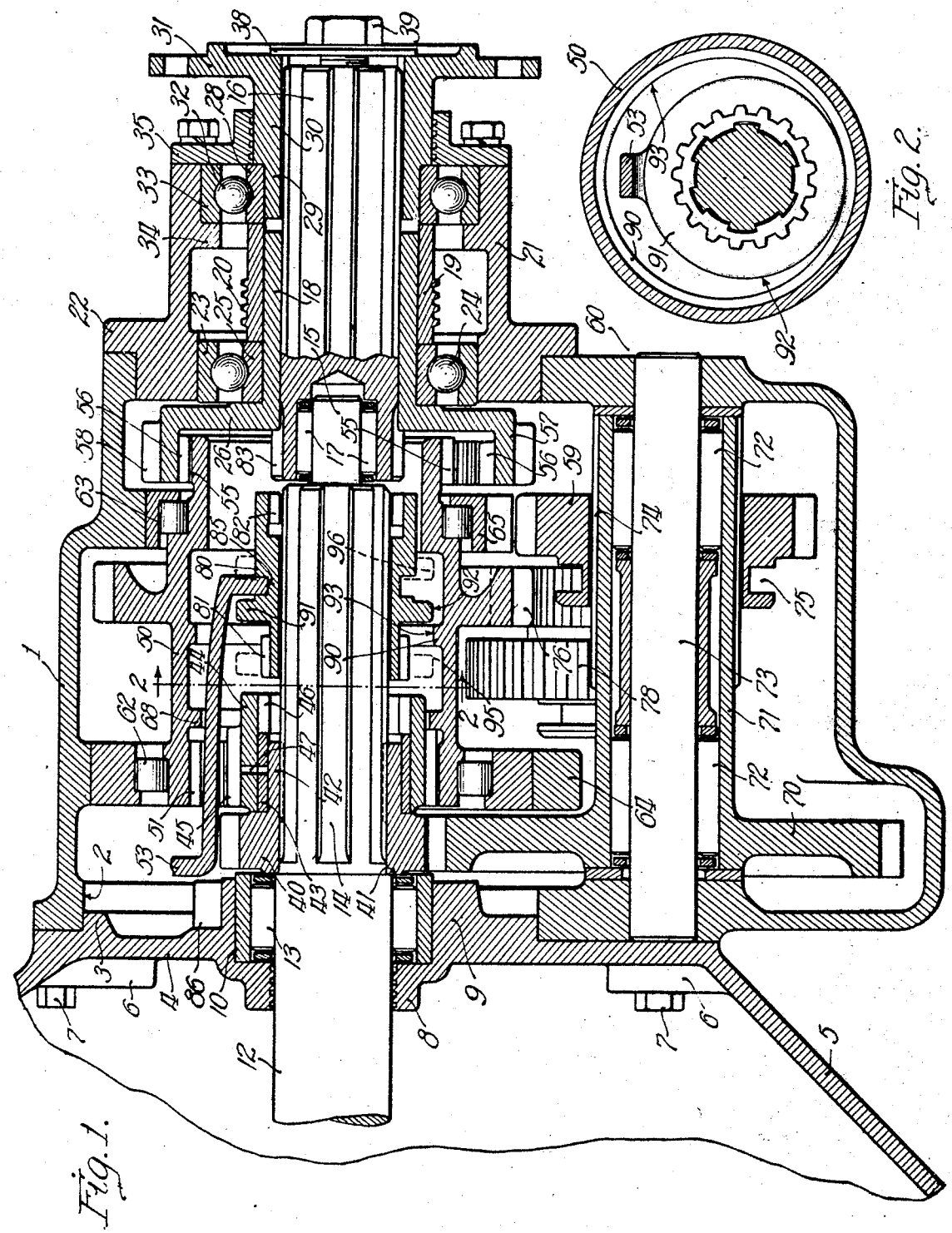
Figure 1 is a longitudinal section through a transmission embodying the present invention.
Figure 2 is a detail section, taken on the line 2—2 of Figure 1.

The transmission illustrated in Figures 1 and 2 includes a suitable casing 1, provided in its forward end with a circular opening 2. This opening 2 receives an annular flange 3 on the rearward face of an end plate 4 of a bell-shaped section 5 of the clutch housing. Plate 4 may be provided with suitably spaced bosses 6, through which pass cap screws 7, these cap screws threading into the forward end of the casing 1 to secure the casing 1 to the section 5 of the clutch housing.

Plate 4 is also provided with a central collar 8 projecting forwardly from the front face thereof, this collar being disposed concentric with a larger collar 9 extending from the rearward face of the plate 4 and the collar 9 may be thickened, as shown, or braced for strength as desired. Collar 9 is provided with an annular recess in its inner face in which seats a bearing or bushing ring 10 of brass, bronze or other suitable material. Within the ring 10 and between this ring and the drive shaft 12 is an antifriction bearing 13 of suitable type, such as a roller bearing. The drive shaft 12 is driven directly from the crank shaft of the engine thru a suitable clutch within the clutch housing, as is well understood in the art.

Inwardly or rearwardly of the collar 9, the drive shaft 12 is splined at 14 and at its inner or rear end, beyond the splined portion 14, the shaft 12 is reduced to provide a stud 15, which projects into an axial bore in the inner or forward end of a driven shaft 16. Roller bearings 17 are disposed between the stud 15 and the surrounding wall of the bore into which this stud extends. A sleeve 18 is keyed upon shaft 16 and carries a collar 19 drivingly secured thereon. The collar 19 may be provided with a worm 20, which may mesh with a worm wheel (not shown) of an odometer or other device. The driven shaft 16 passes through a cylindrical bearing supporting member 21, which is provided, adjacent its forward end, with an outer peripheral flange 22, which may be secured by cap screws (not shown) to the rearward end of casing 1.

A bearing ring 23 is mounted in the opening at the inner or forward end of member 20 and is provided in its inner face with a circumferential groove forming a raceway for bearing balls 24, which also operate in a raceway formed in the outer face of a bearing ring 25, which is secured on sleeve 18 and abuts the rearward face of an outwardly projecting shoulder 26 at the inner end of the sleeve 18. The opposite or rearward side of the ring 25 abuts the forward end of the sleeve or collar 19, which collar 19 is confined between the ring 25 and a bearing ring 28, secured on the inner reduced portion 29 of neck 30 of a coupling member 31, which is keyed on the driven shaft 16 and cooperates or is connected with a second coupling member (not shown) for establishing a driving connection between the shaft 16 and the propeller shaft of the automobile. The bearing balls 32 are confined between the ring 28 and an outer bearing ring 33 mounted within the outer end of the member 21 and confined between flange 34 and a suitable cap plate 35. The internal peripheries of the openings through the collar 8 and plate 35 may be grooved, as shown, to further seal the lubricant within the casing. The coupling member 31 may be held against endwise movement rearwardly of shaft 16 by washer 38, secured in position by a nut 39. The foregoing details are substantially as disclosed in my prior application, Serial No. 197,777, filed June 10, 1927, wherein the advantages are more fully explained.

A pinion 40 is keyed or splined upon splined portion 14 of the shaft 12 adjacent the rearward end of the roller bearing 13, the enlarged forward end of the shaft 12 providing an annular shoulder 41, which cooperates with the forward face of the pinion 40 and seats this pinion against movement along the shaft 12 in a forward direction. This pinion 40 is provided with a rearwardly extending neck 42, about which is disposed a bearing or bushing sleeve 43 of brass or other suitable material. A second pinion 44 is rotatably mounted on bearing sleeve 43 and is provided externally at its forward end with the external gear teeth 45 and internally at its inner end and rearwardly beyond the bearing sleeve 43 with internal teeth 46. Lubricant may be supplied to the bearing sleeve 43 through a radial opening 47.

A sleeve 50 is disposed about shafts 12 and 16 in eccentric relation thereto. This sleeve 50 is provided at its forward end with internal gear teeth 51, which mesh with the external teeth 45 of the pinion 44, for example, at the under portion of shaft 12. The upper or opposite portion of the sleeve 50 is spaced from the upper or opposite portion of the pinion teeth 45 and permits the shift arm 53 to be introduced directly into the sleeve 50 from the forward end thereof. At its rearward end, sleeve 50 is provided with an external gear 55, which meshes with an internal gear 56 on the inner face of flange 57, which is formed integrally with the flange or shoulder 26 of sleeve 18. Flange 57 is also provided with an external gear 58, with which a shiftable gear 59 on the lay shaft 60 is adapted to be moved selectively into and out of mesh.

The eccentric sleeve 50 has support preferably through suitable anti-friction bearings 62 and 63 in suitable bearing rings or web elements 64 and 65, formed integrally with the casing adjacent the forward end of the sleeve 50 and just short of the external gear 55 at the rearward end of the sleeve 50.

It will be noted, in Figure 1 of the drawings, that spaced rearwardly slightly from the internal teeth 51 the eccentric sleeve 50 has an internal flange 68. Teeth 45 of pinion 44 are longer than the teeth 51, these teeth 45 projecting rearwardly beyond the cooperating teeth 51, into cooperation with the internal flange 68. The sleeve 50 is held against forward and rearward movement within the casing through its mounting and bearing supports and the cooperation of the flange 68 with the rearward ends of the teeth 45 of the pinion 44 holds the pinion 44 against rearward movement and effectively confines the same between the flange 68 and the rearward face of the pinion 40 which is, in turn, held against forward movement by its cooperation with the shoulder 41. This positioning of the pinion 44 is one of the features of improvement of the present invention over the device disclosed in my prior application last mentioned. It should also be noted that the teeth 46 are in the form of internal gear teeth as distinguished from longitudinally extending clutch teeth. By the use of teeth of this sort and making these teeth 46 slightly shorter than the distance between the rearward end of the neck 42 and the rearward end of the pinion 44, the bearing sleeve 43 is held in place by the forward faces of the teeth 46, said sleeve 43 being confined between the rearward face of the pinion 40 and the forward faces of the teeth 46.

Pinion 40 meshes with a relatively large spur gear 70, formed integrally with the sleeve or tubular lay shaft 71 at the forward end thereof. Sleeve 71 is shown as being rotatably mounted by means of suitable anti-friction bearings, such as the roller bearings 72, on a spindle 73, which may be suitably secured at its opposite ends in the end walls of the casing 1, which may be thickened along these portions, as shown. The spur gear 59 is splined on the sleeve or lay shaft 71, this gear 59 being provided with a grooved neck 75 by means of which the gear may be shifted into and out of mesh with the external teeth 58 of the sleeve 18, as well as into and out of mesh with an external gear 76. The external gear 76 is shown as being formed integral with the eccentric sleeve 50 and a suitable reverse gear 78 is provided for reversing the drive to the propeller shaft, as more fully disclosed in my prior applications hereinbefore referred to. The use of a single gear 59, which is adapted to be meshed selectively with either the teeth 58 or the gear 76 for obtaining both low speed and second speed with the single gear 59, is a further feature of improvement over the device disclosed in my prior application, Serial No. 197,777, filed June 10, 1927. The use of the single gear 59 for two speeds eliminates the additional lay shaft gear heretofore necessary and this simplifies and reduces the inertia and bulk of the moving gear means on the lay shaft over that obtained where two of said gears are rigidly joined, as heretofore. In addition, a pair of separately shiftable gears on the lay shaft for this purpose have increased the shifting connections necessary which is avoided with the single gear 59.

Splined upon the splined portion 14 of the drive shaft 12 is a shiftable clutch or connecting sleeve 80, provided at its forward end with radial clutch or other suitable teeth 81 for engagement with the inwardly extending radial clutch or suitable gear teeth 46 of the pinion 44. The opposite or rearward end of the sleeve 80 is provided with suitable internal teeth, preferably gear teeth, 82, which are adapted to mesh with external teeth 83 at the forward end of the driven shaft 16. The sleeve 80 is grooved at 85 to receive the shift arm 53 and the collar 9 may be recessed at 86 to receive the opposite end of the arm 53, as it is shifted forwardly. The shift arm 53, as well as the gear 59 and any other shiftable parts, may be shifted from the control lever of the vehicle in any suitable or preferred manner, such as more fully disclosed in my prior application, Serial No. 200,822, filed June 23, 1927. This particular shifting means forms no part of the present invention and is, therefore, omitted, reference being had to my last-mentioned prior application for a full disclosure of means suitable for this purpose.

With the parts in the positions shown in Figure 1, the connecting sleeve 85 is in neutral position and the shafts 12 and 16 are disconnected. When it is desired to start the automobile, the gear 59 on the lay shaft is shifted forwardly into mesh with the gear 76. This gives a low speed forward driving connection from the drive shaft 12 to the driven shaft 16 through pinion 40, gear 70, lay shaft or sleeve 71, gear 59, gear 76, eccentric sleeve 50, external gear 55 and internal gear 56 to the driven shaft 16 through the sleeve 19.

Shifting the gear 59 rearwardly into mesh with external gear 58 gives the second speed forward connection between the two shafts, the drive in this instance being around the sleeve 50. When the third and fourth speeds are used, the gear 59 is in its neutral or inoperative position, as illustrated in Figure 1. With the gear 59 in neutral, when the sleeve 80 is shifted forwardly to mesh the external teeth 81 with the internal teeth 46, the pinion 44 is thus clutched to the drive shaft 12 and shaft 16 is then driven from shaft 12 through pinion 44, gear teeth 51, sleeve 50 and gears 55 and 56 to the sleeve 18. This gives a gear ratio drive between the two shafts to produce the third speed forward. By shifting the connecting sleeve 8 rearwardly to engage the internal teeth 82 with the external teeth 83 on the driven shaft 16, the driving and driven shafts are clutched or connected directly together to give a direct high speed driving connection between the two shafts to produce the fourth speed forward drive.

I find that getting into low gear in most any weather is not much of a problem, but going into the ratio next to high or third speed in this particular embodiment of the invention or from high gear back to third or the next lower ratio presents the problems referred to at the outset. I overcome this by providing the sleeve 50 and connecting sleeve 80 with cooperable synchronizing elements 90 and 91, respectively. The synchronizing element 91 on the sliding member 80 is in the form of an outwardly extending radial flange, the outer periphery of which may be concentric with the shaft 12 and the synchronizing element 90 is in the form of an inwardly extending integral flange or ring integral with the sleeve 50.

The inner periphery of the flange or ring 90 may be concentric with the axis of the sleeve 50 and it will be noted that, with the parts in the positions shown, the ring or flange 90 is just ahead forwardly of the flange or ring 91. Therefore, when the sliding clutch member 80 is shifted forwardly, the outer periphery 92 of the flange 91 comes into contact with the inner periphery or raceway 93 of the element 90, first and before the teeth 81 are engaged with the teeth 46. This contact between the outer periphery of the shoulder 91 and the inner periphery of the ring or race 90 tends to bring the clutch shaft or driving shaft to approximately or substantially the speed of rotation of the pinion 44. This synchronization or reduction in the differential speeds of teeth 81 and 46 enables shifting of the teeth 81 into mesh with the teeth 46 easily and noiselessly, as well as quickly and without losing time in neutral. In shifting the clutch sleeve 80 from third gear to high or direct drive, the flange 91 again contacts the flange 90 before the teeth 82 are engaged with the teeth 83 and this contact tends to synchronize or at least reduce the differential between the speed of the internal teeth 82 and the speed of the teeth 83 before these gears are engaged. With the teeth 82 thus brought to substantially the speed of the teeth 83 or substantially synchronized with the teeth 83 through the turning sleeve 50 at the contact of the synchronizing elements 90 and 91, the teeth 82 are adapted to be shifted without hesitation into engagement with the teeth 83 quickly, noiselessly, and with a continuous movement of the control lever.

It will be noted that when the teeth 81 are shifted fully into engagement with the teeth 46, the flange 91 has moved past or forwardly out of engagement with the ring or flange 90, as shown in dotted lines at 95, in Figure 1, and when the teeth 82 are shifted fully into engagement with the teeth 83, the flange 91 is rearwardly beyond and out of contact with the flange 90, as shown in dotted lines at 96. Therefore, the synchronizing or differential speed decreasing means synchronizes or reduces the differential between the teeth in this particular transmission, just before movement into the third and fourth speeds and when the third and fourth speed teeth are fully meshed, there is no further contact between the synchronizing flanges 90 and 91, so that there is no wear on these parts at that time.

Likewise, in going from high or fourth speed to third speed, which has always been more difficult, commonly requiring bringing the car to practically a standstill, the flange 91 comes into contact with the race 90 first and picks up the speed of the clutch shaft so that, when engagement is made, the clutch and socket are turning at approximately the same speed. They may be formed so that they will not turn at exactly the same speed and where I use the term synchronizing herein or in the appended claims, I use that term in the broader or more general sense, not only bringing the members which are to be meshed to exactly the same speeds, but to bringing these members to approximately the same speeds or to reducing the differential speeds between them. The flanges 90 and 91 are, preferably, chambered off a little at each end to avoid possible hindrance to the movement of the shifting clutch member as the flange 91 is brought into contact with the flange 90.

In the manufacture of the transmission, it will, preferably, be laid out so that whenever the flange 91 comes into contact with the race 90, there will be a little pressure thereon. It only requires about twenty inch pounds torque to obtain the desired result under normal conditions and, therefore, there will not be any great wear. Both of the flanges or synchronizing elements 90 and 91 are, preferably, of case hardened steel and the tapering or chamfering at the edges will permit easy engagement in either direction. Under driving conditions, when the synchronizing elements are called upon to operate, the clutch shaft and other parts are both rotating, so that it is only the difference in speed that has to be fixed up. Of course, the synchronizing means may be extended to other speeds or ratios of the transmission, as desired. It will be particularly noted that the synchronizing means is brought into action by movement of the clutch sleeve 80 and this synchronizing means is then disengaged by continued movement of the clutch sleeve in the same direction. This eliminates the complicated releasing devices and other connections heretofore referred to.

I contemplate making the race 90 in the form of an adjustable ring, providing a small plugged hole through which a screw driver may be inserted to turn a screw that would decrease the inside diameter of the race 90, in order to take up any wear between the parts, should it be found desirable. Of course, alternatively, the element 91 could be made adjustable for taking up wear, but these wear takeup provisions have been purposely omitted from the drawings, in order to show the device in its simplest form, which is satisfactorily operable for the purposes intended.

The transmission disclosed in Figure 3 is, generally, the same as that disclosed in Figure 1, with the exception that the external gear teeth 58 and the corresponding speed or gear ratio provided thereby are omitted. Such other variations of the device of Figure 1 as are not hereinafter referred to are fully disclosed in my prior application, Serial No. 200,822, filed June 23, 1927 and, in so far as they form no part of the present invention, will not be described in detail here. Suffice it to say that with the parts in the positions illustrated in Figure 3, the drive and driven shafts 12' and 16' are disconnected. By shifting the clutch member 100 forwardly to engage the external teeth 101 with the internal teeth 102 of the pinion 103, the pinion is clutched to the drive shaft 12' for rotation therewith. Driven shaft 16' is then driven from the shaft 12' through pinion 103, meshing external gear 104, eccentric sleeve 105, external gear 106 at the rearward end thereof, meshing internal gear 107 and through the sleeve 108 to the driven shaft 16'. This gives a gear ratio drive between the two shafts to produce the second speed forward. By shifting the clutch member 100 rearwardly to engage the internal teeth 110 at the rearward end thereof with the external teeth 112 at the forward end of the driven shaft 16', the driven shaft 16' is clutched directly to the drive shaft 12', giving a direct or high speed driving connection between the two shafts to produce the third speed forward drive. In neutral, as well as in the second and third speeds, the shiftable lay gear 115 is positioned substantially as shown.

With the shiftable clutch or connecting member 100 in neutral position, as illustrated, when the gear 115 is shifted into mesh or operative relation with the external gear 116 integral with the eccentric sleeve 105, the drive is from the pinion 117 through gear 118, sleeve or lay shaft 119, gears 115 and 116, eccentric sleeve 105, and gears 106 and 107 and sleeve 108, to driven shaft 16'. This gives the low speed forward driving connection between the drive and driven shafts.

In this case, the synchronizing means acts in shifting from second to third speed or direct drive and in shifting back from third or direct drive to second speed forward. The synchronizing element 120 is, as in the previous embodiment, in the form of an internal flange on the eccentric sleeve 105 and its edges may be chamfered or tapered as before, so that the engagement of the synchronizing elements will be easy in either direction. In this case, however, the element 121 comprises an integral radial flange on the clutch or connecting member 100 with a surrounding synchronizing ring 122, yieldingly held in place and yieldingly cooperable with the race 120. The outer periphery of the flange 121 has a circumferential groove 123 in which is fitted a circumferentially corrugated annular spring 124. The spring 124 is expandable sufficiently to permit its being snapped over the flange 121 and into place in the groove 123 and the outer ring 122 is adapted to be snapped into place with the spring 124 under tension, the spring immediately expanding into the groove 125 in the inner periphery of the ring 122 and holding the ring 122 securely against displacement.

Obviously, the ring 122 is held out to its proper place by the spring 124 and this spring allows the ring 122 to yield a little so that, in manufacture, it is not necessary to work to such close dimensions and, at the same time, the spring may press the ring into engagement with the race 120, as the ring moves into cooperation therewith. This will assist in picking up the clutch shaft speed or reducing it, as the case may be. As before, the synchronizing means is engaged and disengaged by movement in the same direction and the operation between the second and third speeds of this device is substantially the same as the operation between the third and fourth speeds of the device of Figure 1.

It is to be understood, of course, that the outer spring ring 124 of Figures 3 and 4 may be embodied in the synchronizing device of Figures 1 and 2, or this outer ring and the spring which is interposed between it and the flange 121 may be omitted in the device of Figures 3 and 4, just as in Figures 1 and 2. Of course, where the synchronizing means of the present invention is embodied in a conventional or other type of transmission, the synchronizing elements may be differently arranged and carried by different parts and changes and variations of this sort are contemplated within the scope of the present invention.

I claim:

1. In a transmission, a driving shaft, a driven shaft, a gear ratio connection between said shafts, a connecting sleeve splined upon the driving shaft and shiftable to connect said shafts directly or through said gear ratio connection, a surrounding and eccentrically disposed synchronizing race connected to move with said gear ratio connection, and a synchronizing element on said connecting sleeve and shiftable into and past contact with said race in each direction.

2. In a transmission, a driving shaft, a driven shaft, a pinion loosely surrounding the driving shaft, an internal gear on the driven shaft, an eccentric sleeve having an external gear at one end meshing with the internal gear on the driven shaft and an internal gear at the opposite end meshing with the pinion surrounding the driving shaft, a connecting sleeve splined upon the driving shaft and shiftable to connect said shafts directly or said pinion to said driving shaft, a synchronizing race on said surrounding sleeve and a synchronizing element on said connecting sleeve and shiftable therewith into and past contact with said race.

3. In a transmission, a driving shaft having an annular shoulder, a pinion splined upon said shaft and seated in one direction against said shoulder, said pinion having an extending neck, a second pinion mounted upon said extending neck, an eccentric sleeve surrounding the driving shaft and having internal teeth meshing with said second pinion, said eccentric sleeve having an internal annular flange spaced longitudinally from the internal teeth of said sleeve and the teeth of the second pinion being of greater length than the internal teeth of said sleeve and abutting said flange and confined between it and said first pinion.

4. In a transmission, a driving shaft having an annular shoulder, a pinion splined upon said shaft and seated in one direction against said shoulder, said pinion having an extending neck, a second pinion mounted upon said extending neck, an eccentric sleeve surrounding the driving shaft and having internal teeth meshing with said second pinion, said eccentric sleeve having an internal annular flange spaced longitudinally from the internal teeth of said sleeve and the teeth of said second pinion being of greater length than the internal teeth of said sleeve and abutting said flange and confined between it and said first pinion, said second pinion having internal teeth outwardly beyond the neck of said first pinion and a bearing sleeve interposed between the neck of said first pinion and said second pinion and confined longitudinally between said first pinion and the internal teeth on said second pinion.

5. In a transmission, a driving shaft, a driven shaft, a pinion splined upon the driving shaft, a lay shaft, a gear on the lay shaft meshing with said pinion, a pinion surrounding the driving shaft and normally loose thereon, an internal gear on the driven shaft, an eccentric sleeve having an external gear at one end meshing with the internal gear on said driven shaft, and an internal gear at the opposite end meshing with said last pinion, a second external gear on said eccentric sleeve, an external gear on the driven shaft, a single gear shiftable on the lay shaft selectively into and out of engagement with said second gear of the eccentric sleeve or with the external gear on the driven shaft, and means for selectively connecting said driving and driven shafts directly or the pinion loosely surrounding the driving shaft for rotation therewith.

6. In a transmission, a driving shaft, a driven shaft, a pinion loosely surrounding the driving shaft, a pinion fast on said driving shaft, means providing an internal gear and an external gear on the driven shaft, an eccentric sleeve having an external gear at one end meshing with the internal gear on the driven shaft and an internal gear at the opposite end meshing with the pinion loosely surrounding the driving shaft, a connecting sleeve splined upon the driving shaft and shiftable to connect said shafts directly or said first mentioned pinion to said driving shaft, an external gear on said eccentric sleeve and intermediate the ends thereof, a lay shaft having a gear fixed thereto and in mesh with said pinion fast on the driving shaft, a gear splined on said lay shaft and movable into and out of mesh with said intermediate gear and into and out of mesh with the external gear on the driven shaft.

7. In a transmission, a driving shaft, a driven shaft, a pinion loosely surrounding the driving shaft, a pinion fast on said driving shaft, an internal gear on the driven shaft, an eccentric sleeve having an external gear at one end meshing with the internal gear on the driven shaft and an internal gear at the opposite end meshing with the pinion loosely surrounding the driving shaft, a connecting sleeve splined upon the driving shaft and shiftable to connect said shafts directly or said first mentioned pinion to said driving shaft, an external gear on said eccentric sleeve and intermediate the ends thereof, a lay shaft having a gear fixed thereto and in mesh with said pinion fast on the driving shaft, a gear splined on said lay shaft and movable into and out of mesh with said intermediate gear, and a synchronizing race on said surrounding sleeve and synchronizing element on said connecting sleeve and shiftable therewith into and past contact with said race.

8. In a transmission, a driving shaft, a driven shaft coaxial therewith, gear ratio means for connecting said shafts, a connecting sleeve connected to turn with one shaft and shiftable to connect said shafts directly or through said gear ratio means, and a pair of annular synchronizing members, one movable with the connecting sleeve and engageable with the other synchronizing member in the movement of said sleeve, one of said synchronizing members surrounding the other synchronizing member when said members are in engagement and the connecting sleeve being movable with respect to said surrounding synchronizing member after said members are in engagement and in the direction for effecting engagement of said members.

9. In a transmission, a driving shaft, a driven shaft coaxial therewith, gear ratio means for connecting said shafts and including a gear member loose on one of said shafts, first clutch teeth fixed to turn with the other shaft, a connecting sleeve connected to turn with the other shaft, a connecting sleeve connected to turn with the shaft upon which said gear member is loose and shiftable in opposite directions between said gear member and said first clutch teeth, said connecting sleeve having clutch teeth at opposite ends, the clutch teeth at one end being engageable with said first clutch teeth to connect said shafts directly together by movement of said sleeve in one direction, the clutch teeth at the opposite end of said sleeve being engageable with said gear member for connecting said gear member to turn with the shaft upon which it is loose to connect the shafts through the gear ratio means by movement of the sleeve in the other direction, an annular synchronizing member movable with the connecting sleeve and a cooperating annular synchronizing member in the path of movement of said first synchronizing member and engageable by said first member in the movement thereof for synchronizing the sleeve member with respect to the member with which it is to be engaged.

10. In a transmission, a driving shaft, a driven shaft coaxial therewith, gear ratio means for connecting said shafts and including a gear member loose on one of said shafts, first clutch teeth fixed to turn with the other shaft, a connecting sleeve connected to turn with the shaft upon which said gear member is loose and shiftable in opposite directions between said gear member and said first clutch teeth, said connecting sleeve having clutch teeth at opposite ends, the clutch teeth at one end being engageable with said first clutch teeth to connect said shafts directly together by movement of said sleeve in one direction, the clutch teeth at the opposite end of said sleeve being engageable with said gear member for connecting said gear member to turn with the shaft upon which it is loose to connect the shafts through the gear ratio means by movement of the sleeve in the other direction, an annular synchronizing member movable with the connecting sleeve and a cooperating annular synchronizing member in the path of movement of said first synchronizing member and engageable by said first member in the movement thereof for synchronizing the sleeve member with respect to the member with which it is to be engaged, said connecting sleeve being movable with respect to one of said synchronizing members after engagement of said members and in the direction for effecting such engagement, and one of said synchronizing members surrounding the other synchronizing member when said members are in engagement.

In witness whereof, I hereunto subscribe my name this 3rd day of November, 1928.

THOMAS L. FAWICK.

CERTIFICATE OF CORRECTION.

Patent No. 1,860,142.                                             May 24, 1932.

THOMAS L. FAWICK.

It is hereby certified that error appears in the printed specification of the above numbered patent requiring correction as follows: Page 7, lines 18 and 19, claim 9, strike out the words and comma "a connecting sleeve connected to turn with the other shaft,"; and that the said Letters Patent should be read with this correction therein that the same may conform to the record of the case in the Patent Office.

Signed and sealed this 12th day of July, A. D. 1932.

(Seal)

M. J. Moore,
Acting Commissioner of Patents.